P. GHEZZI.
WEIGHING APPARATUS.
APPLICATION FILED MAR. 30, 1915.
1,246,259.
Patented Nov. 13, 1917.
2 SHEETS—SHEET 1.
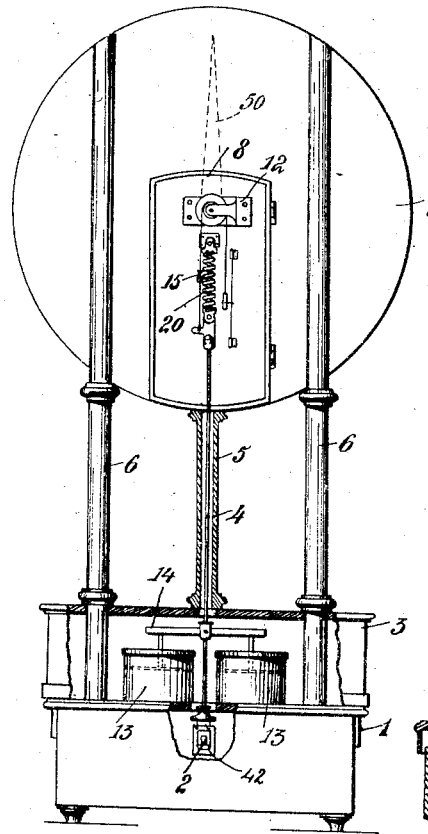
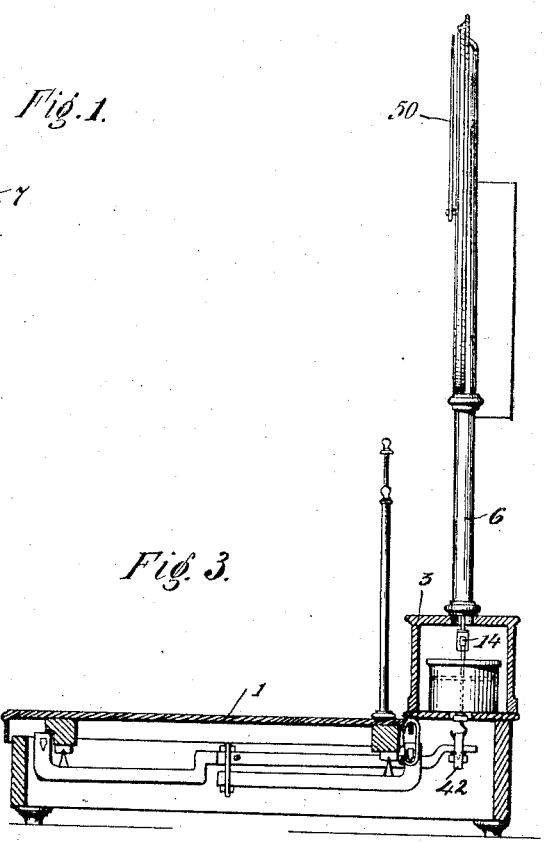
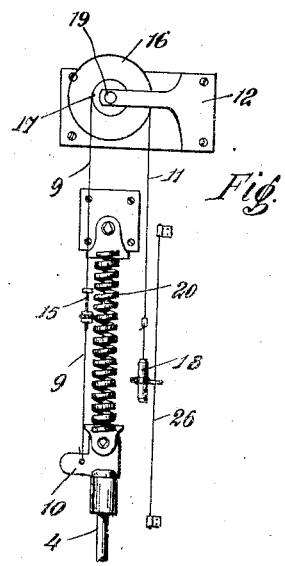
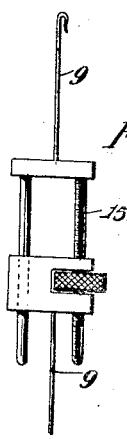
Inventor:
Paolo Ghezzi
per H. W. Waghorn
Attorney.

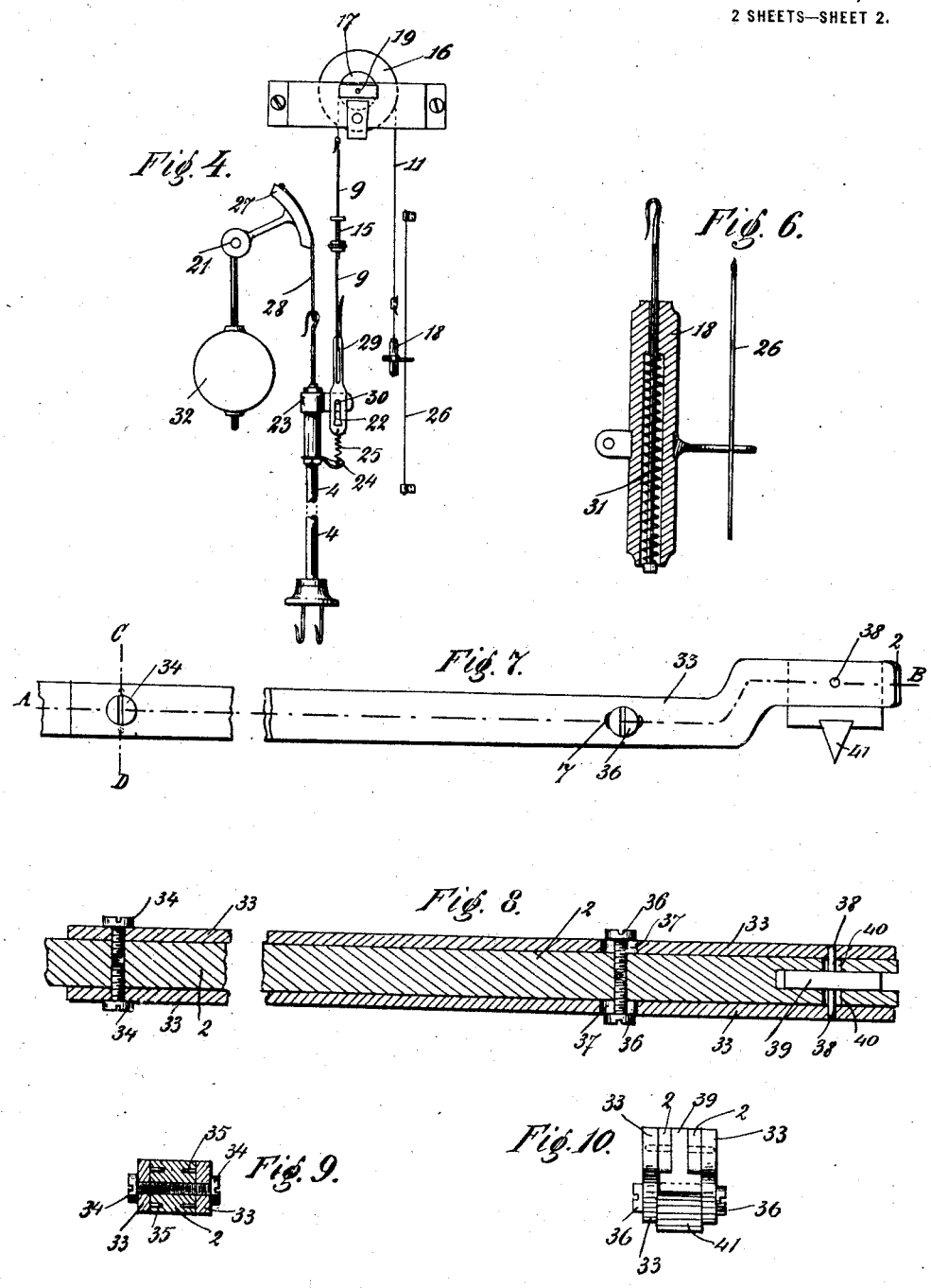

UNITED STATES PATENT OFFICE.

PAOLO GHEZZI, OF MILAN, ITALY.

WEIGHING APPARATUS.

1,246,259.      Specification of Letters Patent.      Patented Nov. 13, 1917.

Application filed March 30, 1915. Serial No. 18,067.

*To all whom it may concern:*

Be it known that I, PAOLO GHEZZI, subject of the King of Italy, resident of Milan, in the Kingdom of Italy, No. 19 Via Pontaccio, have invented new and useful Improvements in Weighing Apparatus, of which the following is a specification.

This invention relates to improvements in weighing apparatus both of the ordinary pan scales of the type protected by the United States patent applied for September 26th, 1913, Serial No. 791,975 and of the bridge balances (bascules) and specially refers to the automatic indicating mechanisms and to a compensating device for the variations of length of certain parts due to changes of temperature of the atmosphere.

Figure 1 represents a back elevation of a weighing apparatus of the type of a bridge scale showing the mechanism for indicating the weights of the bodies placed upon the weighing bridge or platform; Fig. 2 represents a view of said mechanism on a larger scale; Fig. 3 is a side elevation partly in section of the weighing apparatus Fig. 1; Fig. 4 is a modified form of the mechanism represented in Fig. 2; Figs. 5 and 6 some details; Fig. 7 shows a side-view of the compensating device for the changes of temperature applied to a bridge balance; Fig. 8 is a section on the line A—B of Fig. 7; Fig. 9 represents a section on the line C—D of Fig. 7 and Fig. 10 is a front view of Fig. 7.

1 is the pan or bridge of a bridge weighing apparatus which may be supported and counter-balanced in any suitable way; 2 the lever operating the weight indicating mechanism at one end of which is attached the rod 4 that transmits the movement from the bridge to said mechanism; 3 is a casing on the front portion of the platform of the weighing apparatus wherein are placed a couple of damping pistons 13, 13 whose rods are bridged by a small bar 14 fixed to the rod 4.

The rod 4 extends through a bored standard 5 and is connected to the counterbalancing spring mechanism fitted into a box 8 fixed to one face of the disk or dial 7 carried by the standards 6 provided on the stand 3. In the box 8 is a bracket 12 whose end 19 in alinement with the center of the disk 7 supports the spindle of the pointer; on said spindle is mounted a system of wheels of which one 16, carries a counterweight 18, the other 17, an intermediate rod 9 provided with a tightening device 15 (Fig. 5) for regulating of the tension and the sensibility, as well as for adjusting the weighing apparatus.

The rod 9 is actuated by the rod 4 by means of a connection 10, while a spring 20 counteracts the traction afforded by the rod 4.

The counterweight 18 can be guided by a wire 26 which prevents any lateral oscillation: moreover the cord 11 may be attached to the counterweight yieldingly, for instance, by attaching it to the lower extremity of the spring 31 (Fig. 6) inserted into an axial hole of the counterweight, thus obtaining a further damping of shocks and vibrations.

The modifications shown at Fig. 4 consist in the substitution, for the spring 20, of a counterweight and in applying an elastic member to the rod which transmits the movement to the weight indicating mechanism.

4 is the rod connected at its lower end to the system of levers of the weighing apparatus and at the top to a ribbon 28 of steel or other suitable material lying upon the curved surface of a circular sector 27 placed at the end of a lever fulcrumed at 21 and counterbalanced by the adjustable weight 32. The rod 4 acts therefore directly upon the counterbalanced lever, but indirectly upon the rod 9 which actuates the wheels 16, 17.

24 is a finger projecting from the rod 4 and actuating by means of a spring 25, a member 29 attached to the lower and free extremity of the rod 9. This member 29 has a vertical slot 22 in which the head of a pin 30 projecting from a bracket 23 integral with the rod 4 above the projection 24, can slide. By these means, before the pin 30, sliding to the end of the slot 22 can draw the rod 9 downward, the projection 24 actuates yieldingly the rod itself (by means of the spring 25), thus damping the pull.

The following device serves to compensate the variations of length of the spring and of the various parts of the improved weighing apparatus according to Figs. 1, 2, due to variations of temperature.

On the sides of the lever 2 (Figs. 3 and 7 to 10) are placed two flat bars 33, 33 of a metal having a coefficient of expansion higher than that of the metal constituting the lever 2. One end of each of these bars is rigidly secured to the lever 2 by means of the screw 34 and the pins 35 (Fig. 9)

projecting from the bars 33 into holes provided in the lever 2. On both sides of the lever 2 screws 36 are provided to hold the bars 33, 33 against the lever 2 throughout their entire length and to allow of their movement when, on account of changes of temperature, their lengthening or shortening takes place, a slot 37 being provided to this end in each bar 33.

At the other extremity of the bars 33 are two holes in which are placed the ends of a spindle 38 integral with the head 39 of the knife 41, this head entering a fork at the extremity of the lever 2. This fork is a little longer than the head itself.

Corresponding to the spindle 38 a slot 40 is provided in the lever 2.

Should a change of temperature take place, the small bars 33 will lengthen or shorten, thus displacing the knife 41 and also the support 42 (Fig. 3) upon which it rests.

Having now described my invention and how the same is to be carried out, what I claim as my invention, is:

1. In an automatic weighing apparatus a main lever, a pointer actuating rod, a support at the lower end thereof, a knife on the main lever held by the support, a registering mechanism comprising a pointer, a dial, a pointer spindle and two wheels on said spindle, a yielding connection between the upper end of the actuating rod and one of the wheels adapted to rotate said wheel, a spring in said connection, a cord wound on the second wheel, a counterweight attached thereto, and means for counteracting the drawing action of the actuating rod.

2. In an automatic weighing apparatus a main lever, a pointer actuating rod, a knife pivotally connecting the lever and rod, a spring connected to the actuating rod, a registering mechanism, wheels therein, a cord wound on one of the wheels, a hook suspended on the cord, a connection between the hook and the upper end of the spring and having a slot and a pin, integral with the rod, adapted to slide in the slot.

3. In an automatic weighing apparatus a main lever, a pointer actuating rod, a knife pivotally connecting the lever and rod, a counteracting spring connected to the actuating rod, a registering mechanism, wheels therein, a cord wound on one of the wheels, a cord wound on the other wheel, a counterweight attached thereto, a spring affording a yielding suspension to the counterweight, a projection on the counterweight, a vertical guide wire for said projection.

4. In an automatic weighing apparatus, a main lever, a pointer actuating rod, a spring connected to said rod, a registering mechanism, wheels therein, a cord wound on one of the wheels and connected to one end of the spring, two bars having a coefficient of expansion greater than that of the main lever, and extending substantially the entire length of the lever, one of each of their extremities being fixed to the main lever, a knife pivotally connecting the lever and rod and mounted on the other adjacent ends of said bars, means on the bars and the lever to permit of the free expansion or contraction of the same, said lever being forked to allow of the movement of the knife.

In testimony whereof I hereunto affix my signature in the presence of two witnesses.

PAOLO GHEZZI.

Witnesses:
B. CARLO SALVOTTI,
ARTHUR P. CORDERO.

Copies of this patent may be obtained for five cents each, by addressing the "Commissioner of Patents, Washington, D. C."